United States Patent [19]

Inoue et al.

[11] Patent Number: 5,683,324
[45] Date of Patent: Nov. 4, 1997

[54] TOROIDAL CONTINUOUS VARIABLE TRANSMISSION FOR FOUR-WHEEL DRIVE AUTOMOBILES

[75] Inventors: Eiji Inoue, Sagamihara; Hirohisa Tanaka, Tokyo, both of Japan

[73] Assignee: Isuzu Motors Limited, Tokyo, Japan

[21] Appl. No.: 644,188

[22] Filed: May 10, 1996

[30] Foreign Application Priority Data

May 18, 1995 [JP] Japan ..................... 7-142354

[51] Int. Cl.$^6$ .................. F16H 37/08; F16H 15/38
[52] U.S. Cl. .................... 475/216; 475/198; 475/200; 475/206; 475/218; 74/665 M; 74/665 N
[58] Field of Search ................. 475/207, 215, 475/216, 217, 218, 198, 200, 206; 74/665 L, 665 M, 665 N

[56] References Cited

U.S. PATENT DOCUMENTS

| | | | |
|---|---|---|---|
| 4,641,548 | 2/1987 | Greenwood | 475/217 |
| 4,922,788 | 5/1990 | Greenwood | 475/216 |
| 5,230,670 | 7/1993 | Hibi | 475/215 |

FOREIGN PATENT DOCUMENTS 5-157151  6/1993  Japan.

*Primary Examiner*—Charles A. Marmor
*Assistant Examiner*—Sherry Lynn Estremsky
*Attorney, Agent, or Firm*—Browdy and Neimark

[57] ABSTRACT

The toroidal continuous variable transmission for four-wheel drive automobiles distributes a greater torque to the rear wheels than to the front wheels. The torque of the first driven gear is distributed 50% each to the first output shaft and the second output shaft. The torque of the second driven gear is transmitted 100% to the second output shaft. Hence, when the front wheels are connected to the first output shaft and the rear wheels to the second output shaft, the ratio between torques distributed to the front and rear wheels is about 1:3. In the event that only the front wheels should race reducing the transmitted torque, the torque transferred to the second side gear that is not racing also decreases. The rear wheels, however, are supplied with a torque from the second driven gear and therefore can secure at least 50% of the input shaft torque.

8 Claims, 2 Drawing Sheets

TOROIDAL CONTINUOUS VARIABLE TRANSMISSION FOR FOUR-WHEEL DRIVE AUTOMOBILES

BACKGROUND OF THE INVENTION

1. Field of the Invention

The present invention relates to a toroidal continuous variable transmission, in which two sets of toroidal speed change units are mounted opposite each other on the same shaft, and more particularly to a toroidal continuous variable transmission for four-wheel drive automobiles in which power is transferred to the front and the rear wheels independently from a pair of output disks.

2. Description of the Prior Art

An example of the toroidal continuous variable transmission that can be applied to the four-wheel drive automobiles is shown in FIG. 3 (see Japan Patent Application Laid-Open No. 157151/1993, for instance). This toroidal continuous variable transmission has two toroidal speed change units 1, 2 disposed opposite each other on an input shaft 11 and is called a double cavity type toroidal continuous variable transmission. The toroidal speed change unit 1 (first toroidal speed change unit) has an input disk 3, an output disk 4 arranged opposite the input disk 3, and tiltable power rollers 5 that transfer torque from the input disk 3 to the output disk 4. Likewise, the toroidal speed change unit 2 (second toroidal speed change unit) has an input disk 6, an output disk 7 and tiltable power rollers 8 that transfer torque from the input disk 6 to the output disk 7.

The toroidal speed change unit 1 and the toroidal speed change unit 2 have the same size and the same construction. Let us take, for example, the toroidal speed change unit 1 for detailed explanation. The power rollers 5 are disposed between the input disk 3 and the output disk 4 and are in frictional engagement with the toroidal surfaces of these disks 3, 4. The power rollers 5 can rotate on their own axes 9 and tilt-rotate about tilt axes 10 perpendicular to the rotation axes 9. The power rollers 5 are tilted about the tilt axes 10, which are perpendicular to the rotation axes 9, to specified positions according to a transmission ratio by actuators. The construction of the toroidal speed change unit 2 is similar to that of the toroidal speed change unit 1.

This toroidal continuous variable transmission has a loading cam type pressing device 12 arranged between the input shaft 11 and the input disk 3 and also a similar pressing device 13 between the input shaft 11 and the input disk 6. The pressing device 12 resiliently presses the input disk 3 of the toroidal speed change unit 1 toward the output disk 4, and the pressing device 1 3 resiliently presses the input disk 6 of the toroidal speed change unit 2 toward the output disk 7. The pressing devices 12, 13 include cam plates 14, 15 secured to the input shaft 11 and a plurality of loading cams 16, 17 disposed between cam surfaces of the cam plates 14, 15 and cam surfaces of the input disks 3, 6. As the input shaft 11 and therefore the cam plates 14, 15 rotate, the cam surfaces of the cam plates 14, 15 act on the loading cams 16, 17 to press them against the cam surfaces of the input disks 3, 6. Then the loading cams 16, 17 engage with the cam plates 14, 15 and the input disks 3, 6, causing the input disks 3, 6 to rotate with the input shaft 11.

In this toroidal continuous variable transmission, when the tilt angle of each of the power rollers 5, 8 is changed, the friction engagement points of the power rollers 5, 8 on the input disks 3, 6 and the output disks 4, 7 change, thus performing continuous speed change. The torque transferred from the input disks 3, 6 to the output disks 4, 7 through the power rollers 5, 8 is transmitted by the shearing force of oil under high pressure, i.e., traction force (viscous frictional force). To obtain a desired traction force requires a very large pressing force at the contact points between the power rollers 5, 8 and the both disks 3, 4 and 6, 7. This pressing force is produced by pressing the input disks 3, 6 toward the output disks 4, 7 by the loading cams 16, 17.

A pair of hollow shafts 18, 21 are sleeved over an intermediate part of the input shaft 11 and are supported at their inner ends by bearings 20, 23 so that they are rotatable about the input shaft 11. The hollow shafts 18, 21 have their outer ends rigidly connected with the output disks 4, 7. The hollow shafts 18, 21 have secured to their intermediate portions output gears 19, 22 which are in mesh with driven gears 40, 41 fixed to a pair of output shafts 42, 43. Of the pair of output shafts 42, 43, one 42 is used for driving the front wheels and the other 43 for the rear wheels.

In this toroidal continuous variable transmission, the torque of the input shaft 11 is transmitted from the input disks 3, 6 to the output disks 4, 7 through the power rollers 5, 8 in each toroidal speed change unit 1, 2, from which the torque is further transferred to the output gears 19, 22 drivably connected to the output disks 4, 7, the driven gears 40, 41 meshed with the output gears 19, 22, and the output shafts 42, 43 drivably connected with the driven gears 40, 41. The torque is picked up from the pair of output shafts 42, 43 independently of each other, so that the torque picked up from one output disk 4 is used to drive the front wheels and that taken from the other output disk 7 is used to drive the rear wheels, thus performing the four-wheel driving. In other words, by performing the control so that the tilt angle of one set of power rollers 5 differs from that of the other set of power rollers 8, it is possible to perform the four-wheel driving while offsetting the difference in the rotation speed between the front and rear wheels when making a turn.

In the conventional toroidal continuous variable transmission, two toroidal speed change units are made to carry almost equal torques so that the torques distributed to the front wheels and the rear wheels are virtually equal. In automobiles for commercial use, in which the rear wheels have a heavier axle load than the front wheels and thus require a greater torque, a desired four-wheel driving performance cannot be achieved with the conventional toroidal continuous variable transmission. Hence, the issue with the conventional toroidal continuous variable transmission is how the torque distribution to the rear wheels can be made larger than that of the front wheels, that is, how torques of different magnitudes can be picked up from the two toroidal speed change units of the same size.

SUMMARY OF THE INVENTION

In a toroidal continuous variable transmission for four-wheel drive automobiles which has two toroidal speed change units mounted on the same shaft and in which torques are picked up from the toroidal speed change units independently of each other, the object of this invention is to provide a toroidal continuous variable transmission which is set so as to be able to pick up torques of different magnitudes from the toroidal speed change units and which can distribute appropriate torques to the front and rear wheels according to the kind of vehicle to which the invention is applied.

This invention relates to a toroidal continuous variable transmission for four-wheel drive automobiles, which comprises: an input shaft; a pair of input disks that rotate with the input shaft; a pair of loading cams that transfer a torque of the input shaft to the input disks; a pair of output disks disposed opposite the input disks and rotatably supported on the input shaft; tilt-rotatable power rollers disposed between the opposing input and output disks to transfer the torque from the input disks to the output disks; actuators to tilt-rotate the power rollers about tilt axes perpendicular to rotation axes of the power rollers; a pair of output gears connected to the output disks; a first driven gear and a second driven gear in mesh with the output gears, respectively; a differential mechanism connected to the first driven gear; a first output shaft connected to the differential mechanism; and a second output shaft connected to the differential mechanism and the second driven gear.

In this toroidal continuous variable transmission for four-wheel drive automobiles, the first output shaft drives the front wheels and the second output shaft drives the rear wheels.

The differential mechanism is a bevel gear device which comprises a first side gear connected to the first output shaft, a second side gear disposed opposite the first side gear and connected to the second output shaft, pinions in mesh with the first and second side gears, and a differential case rotatably supporting the pinions and connected to the first driven gear.

Alternatively, the differential mechanism may use a double pinion type planetary gear device, which comprises a sun gear connected to the second output shaft; carriers rotatably supporting pinions in mesh with the sun gear and connected to the first output shaft; and a ring gear in mesh with the pinions and connected to the first driven gear. Further, the pinions comprise first pinions in mesh with the sun gear and second pinions in mesh with the first pinions and with the ring gear.

In the toroidal continuous variable transmission for four-wheel drive automobiles with the above construction, the torques of the first driven gear and the second driven gear are virtually equal in magnitude. Because the first driven gear is connected through the differential mechanism to the first output shaft and the second output shaft, the torque of the first driven gear is distributed to the first output shaft and the second output shaft. On the other hand, the second driven gear is connected only to the second output shaft, so that all the torque of the second driven gear is transferred to the second output shaft. Hence, the second output shaft receives not only the torque from the second driven shaft but also the torque from the first driven gear, and therefore can obtain a greater torque than can the first output shaft. By connecting the first output shaft to the front wheels and the second output to the rear wheels, it is therefore possible to make the torque of the rear wheels larger than that of the front wheels.

When the differential mechanism is constructed of a bevel gear device, the ratio between torques distributed to the first output shaft and the second output shaft is nearly 1:1 or about 50% each. Because the torques transmitted from the first driven gear to the first side gear and the second side gear are almost equal, the torque of the first driven gear is distributed about 50% each to the first output shaft and to the second output shaft. The torque of the second driven gear is transferred 100% to the second output shaft. Hence, the ratio between torques distributed to the first output shaft and the second output shaft is about 1:3, i.e., 25% to one output shaft and 75% to the other. Connecting the front wheels to the first output shaft and the rear wheels to the second output shaft results in the torque distribution ratio between the front and rear wheels of about 1:3. Because approximately 75% of the input shaft torque can be supplied to the rear wheel, an appropriate torque distribution can be realized in the commercial use automobiles that require a greater torque for the rear wheels than that for the front wheels.

Here, words "nearly" and "about" were used. When there is a difference in revolution speed between the front and rear wheels, as when the car is making a turn, the transmission ratios of the two toroidal speed change units do not agree completely because the revolution speed difference is offset. In addition, the differential gear, too, produces a differential. Because of these, the torque distribution ratio is not exactly 1:1. When there is no revolution difference between the front and rear wheels, the torque distribution ratio between the first output gear and the second output gear is precisely 1:1, or the torque distribution ratio between the first output shaft and the second output shaft is 1:3.

When, for example, only the front wheels race in mud or on frozen road, reducing the transmitted torque, the transmitted torque of the second side gear on the side that is not racing also becomes small. That is, the torque transferred from the first driven gear to the rear wheels decreases. The rear wheels, however, are supplied with a torque also from the second driven gear and therefore can secure at least 50% of the input shaft torque.

When the differential mechanism is formed of a planetary gear device, the torque output from the first toroidal speed change unit is transferred to the ring gear connected to the first driven gear and further to the carrier and the sun gear through pinions. The ratio between torques distributed to the carrier and the sun gear is almost $(Zr-Zs)/Zr:Zs/Zr$ where $Zr$ is the number of teeth of the ring gear and $Zs$ is the number of teeth of the sun gear.

The torque transmitted from the first driven gear to the sun gear is combined with the torque transferred to the second driven gear, and is then output to the second output shaft and to the rear wheels. The torque transferred from the first driven gear to the carrier is conveyed as it is to the first output shaft and then to the front wheels. At this time, the ratio between torques distributed to the first driven gear and the second driven gear is nearly 1:1, i.e., 50% each, and the ratio between torques distributed to the first output shaft connected to the front wheels and the second output shaft connected to the rear wheels is $(Zr-Zs)/2Zr:(Zr+Zs)/2Zr$.

Because the torque distribution ratio between the front and rear wheels is given by $(Zr-Zs)/2Zr:(Zr+Zs)/2Zr$, it is possible to set the front to rear wheel torque distribution ratio at a desired value by making an appropriate selection of the gear ratio between the ring gear and the side gear. This means that an optimum torque distribution can be achieved according to the axle load ratio between the front and rear wheels. When the gear ratio between the sun gear and the ring gear is 1:2, the same effect as that obtained when the differential gear is used can be produced.

In this toroidal continuous variable transmission for four-wheel drive automobiles, because the second output shaft can receive torque not only from the second driven gear but from the first driven gear as well, as mentioned above, it can acquire a greater torque than can the first output shaft. Therefore, by connecting the first output shaft to the front wheels and the second output shaft to the rear wheels, it is possible to supply a greater torque to the rear wheels.

DETAILED DESCRIPTION OF THE PREFERRED EMBODIMENTS

Figure 1:
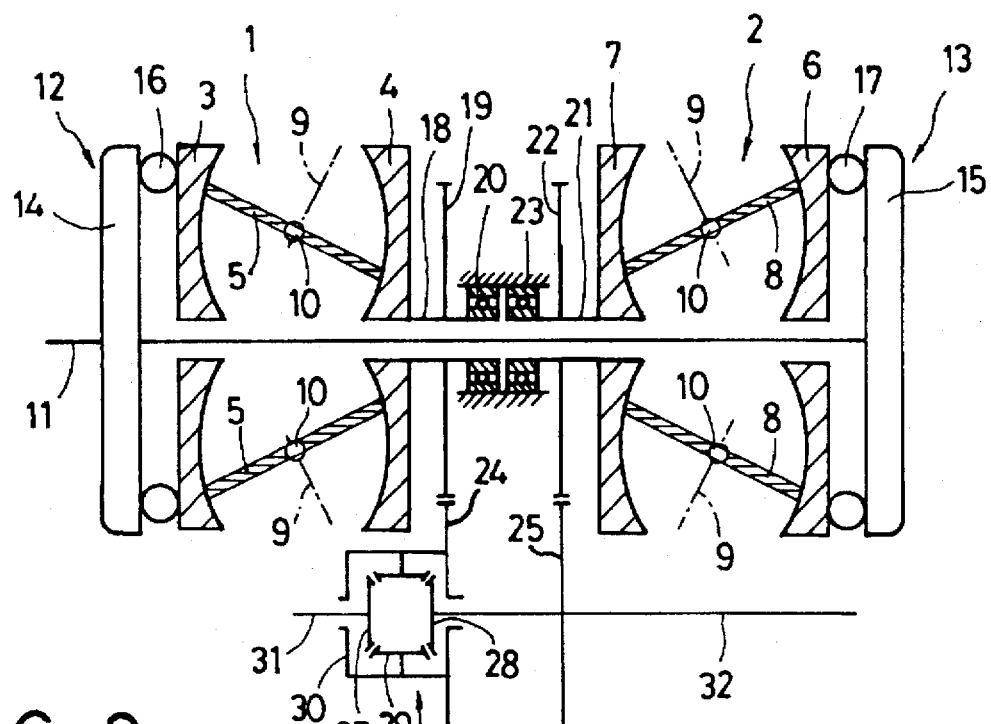
FIG. 1 is a schematic cross section showing the construction of a toroidal continuous variable transmission for four-wheel drive automobiles as one embodiment of this invention.

Now, by referring to the accompanying drawings, embodiments of the toroidal continuous variable transmission for four-wheel drive automobiles according to this invention will be described. FIG. 1 schematically shows the structure of the toroidal continuous variable transmission for four-wheel drive automobiles as the first embodiment of this invention. This toroidal continuous variable transmission for four-wheel drive automobiles is a double cavity type toroidal continuous variable transmission which has two toroidal speed change units 1, 2 mounted opposite each other on the same shaft. The toroidal speed change unit 1 (first toroidal speed change unit) comprises an input disk 3, an output disk 4 arranged opposite the input disk 3, power rollers 5 arranged between the input disk 3 and the output disk 4 and in frictional engagement with spherical, concave toroidal surfaces of both the disks 3, 4, and actuators (not shown) that tilt-rotate the power rollers 5 about their tilt axes 10 perpendicular to their rotation axes 9. The toroidal speed change unit 2 (second toroidal speed change unit) similarly comprises an input disk 6, an output disk 7 disposed opposite the input disk 6, power rollers 8 disposed between the input disk 6 and the output disk 7 and in frictional engagement with spherical, concave toroidal surfaces of both the disks 6, 7, and actuators (not shown) that tilt-rotate the power rollers 8 about their tilt axes 10 perpendicular to their rotation axes 9. The toroidal speed change units 1, 2 each have two power rollers 5, 8. The power rollers 5, 8 are each rotatable on their own rotation axes 9 and also tiltable about their tilt axes 10 perpendicular to the rotation axes 9.

The input shaft 11 is rotatably supported on a casing not shown and is supplied with engine torque through a torque converter not shown. Between the input shaft 11 and the pair of input disks 3, 6 are installed loading cam type pressing devices 12, 13. The pressing device 12 resiliently presses the input disk 3 of the toroidal speed change unit 1 toward the output disk 4, and the pressing device 13 resiliently presses the input disk 6 of the toroidal speed change unit 2 toward the output disk 7. The pressing devices 12, 13 include a pair of cam plates 14, 15 rigidly connected to the input shaft 11 and a plurality of loading cams 16, 17 interposed between the cam surfaces of the cam plates 14, 15 and the cam surfaces formed at the back of the input disks 3, 6. As the input shaft 11 and therefore the cam plates 14, 15 rotate, the cam surfaces of the cam plates 14, 15 presses the loading cams 16, 17 against the cam surfaces of the input disks 3, 6. Then, the loading cams 16, 17 engage with the cam plates 14, 15 and the input disks 3, 6, causing the input disks 3, 6 to rotate with the input shaft 11.

The output disk 4 is securely connected at its back with one end of a hollow shaft 18, which is sleeved over the input shaft 11. The hollow shaft 18 is rigidly connected at its intermediate portion with an output gear 19. The other end of the hollow shaft 18 is rotatably supported by a bearing 20. On the back side of the output disk 4 is arranged back-to-back the output disk 7, which, as with the output disk 4, is secured at its back with one end of a hollow shaft 21 sleeved over the input shaft 11. The hollow shaft 21 is rigidly connected at the intermediate portion with an output gear 22 and, at the other end, is rotatably supported by a bearing 23.

The output gear 19 is in mesh with a driven gear 24. The output gear 22 is in mesh with a driven gear 25. The driven gear 24 is mounted with a differential mechanism 26, which is a bevel gear device comprising oppositely arranged side gears 27 and 28, pinions 29 in mesh with these side gears 27, 28, and a differential case 30 that rotatably supports the pinions 29. The differential case 30 is connected to the driven gear 24. The side gear 27 has an output shaft 31 secured thereto and the side gear 28 has an output shaft 32 secured thereto. Further, the output shaft 31 drives the front wheels through a differential gear (not shown), and the output shaft 32 drives the rear wheels through another differential gear (not shown). The output shaft 32 is coupled not only with the side gear 28 of the differential mechanism 26 but with the driven gear 25 as well and thus can receive torque from both the toroidal speed change units 1, 2.

Next, the operation of the toroidal continuous variable transmission for four-wheel drive automobiles is explained. As the engine starts and the input shaft 11 receives torque from the engine, the torque is transferred to the first input disk 3 through the loading cams 16. At the same time, the torque is also transmitted to the input disk 6 from the input shaft 11 through the other loading cams 17. When the torque is transmitted to the input disk 3, it is rotated causing the power rollers 5 to turn, which in turn rotates the output disk 4. The torque transferred to the input disk 6 is further conveyed through the power rollers 8 to the output disk 7. During the transmission of the torque, tilting the power rollers 5, 8 of the toroidal speed change units 1, 2 about the tilt axes 10 causes the frictional engagement points of the power rollers 5, 8 on the input disks 3, 6 and the output disks 4, 7 change, thus executing continuous speed change operation.

If a synchronous control is performed so that the power rollers 5 of the toroidal speed change unit 1 and the power rollers 8 of the toroidal speed change unit 2 have the same tilt angle, the output gear 19 and the output gear 22 rotate at the same revolution speed. In that case, the pinions 29 do not rotate on their axes, and the driven gear 24, driven gear 25 and side gears 27, 28 rotate together about the output shafts 31, 32. Hence, the torque of the driven gear 24 is distributed 50% each to the output shaft 31 and the output shaft 32. The torque of the driven gear 25 is transferred 100% to the output shaft 32. Therefore, the torque distribution is 25% to the output shaft 31 and 75% to the output shaft 32. In other words, because the front wheels are coupled to the output shaft 31 and the rear wheels to the second output shaft 32, the torque distribution is 25% to the front wheels and 75% to the rear wheels.

In reality, however, when a difference in revolution speed between the front and rear wheels occurs as when a car is making a turn, because this difference is offset by the transmission, the transmission ratios of the toroidal speed change units 1, 2 do not coincide completely. Further, because the differential gear, too, produces a differential. For these reasons, the torque distribution ratio is not exactly 1:1, or 50% each. When there is no revolution speed difference between the front and rear wheels, the torque distribution ratio between the output gear 19 and the output gear 22 is exactly 1:1, or 50% each. Or the torque distribution ratio between the output shaft 31 and the second output shaft 32 is 1:3, i.e., 25% for one output shaft and 75% for the other.

If, when the car is making a turn, the toroidal speed change unit 1 and the toroidal speed change unit 2 are controlled independently, i.e., the tilt angles of the two sets of power rollers 5, 8 are controlled to differ from each other, the revolution speeds of the output gear 19 and the output gear 22 can be made to differ from each other. For example, when the revolution speed of the output gear 19 is higher than that of the output gear 22, the revolution speed of the driven gear 24 is greater than those of the driven gear 25 and the side gear 28, so that the revolution speed of the side gear 27 is greater than that of the driven gear 24. Because the output shaft 31 connected to the side gear 27 drives the front wheels and the output shaft 32 connected to the driven gear 25 and the side gear 28 drives the rear wheels, the revolution speed of the front wheels is higher than that of the rear wheels. Hence, when the car is making a turn, the four-wheel driving can be performed by offsetting the difference in revolution speed between the front wheels and the rear wheels.

When the car is making a turn, the revolution speed of the inside wheels is smaller than that of the outside wheels and at the same time the revolution speed of the rear wheels is smaller than that of the front wheels. The speed difference between the outside wheels and the inside wheels is offset by the differential gear. To offset the speed difference between the front wheels and the rear wheels, the conventional four-wheel-driven automobiles incorporates a differential mechanism called a center differential or a viscous fluid coupling in addition to the transmission. In contrast, the toroidal continuous variable transmission of this invention can offset the speed difference only by the transmission described above.

When only the front wheels race in mud or on frozen road, reducing the torque, the transmission torque of the side gear 28 on the side that is not racing also becomes small. The rear wheels, however, are supplied with a torque from the driven gear 25 and therefore at least 50% of the input shaft torque can be supplied to the rear wheels.

Figure 2:
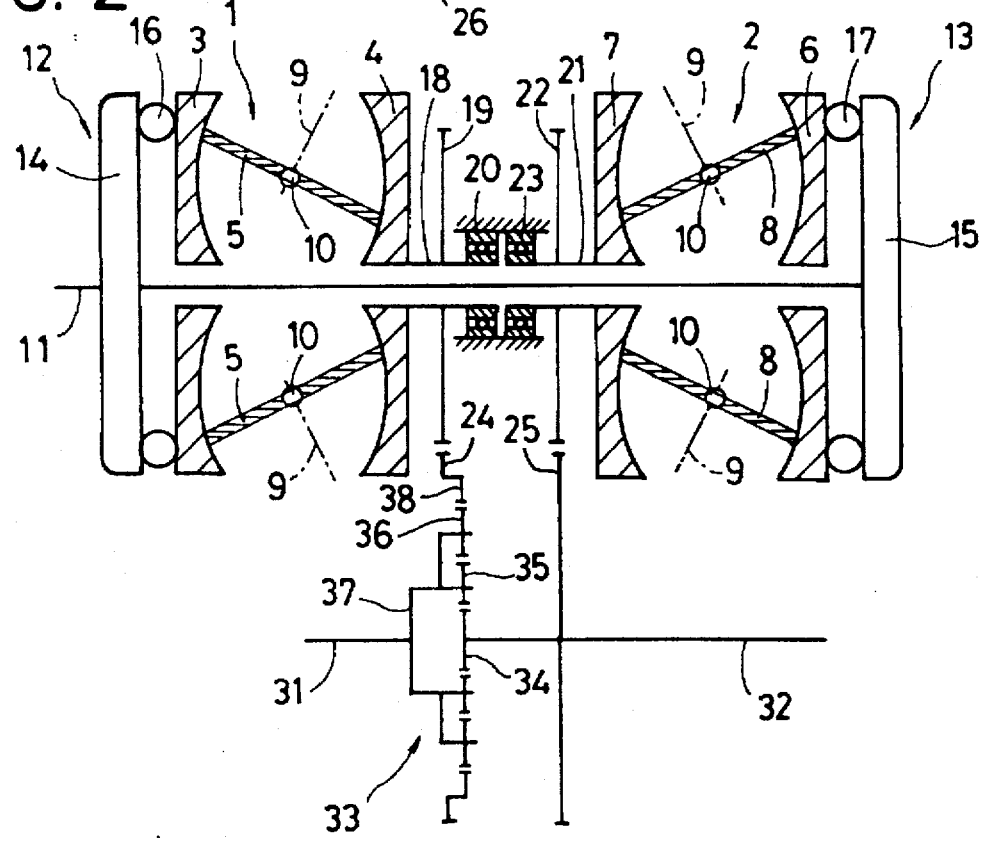
FIG. 2 is a schematic cross section showing the construction of a toroidal continuous variable transmission for four-wheel drive automobiles as another embodiment of this invention.
Figure 3:
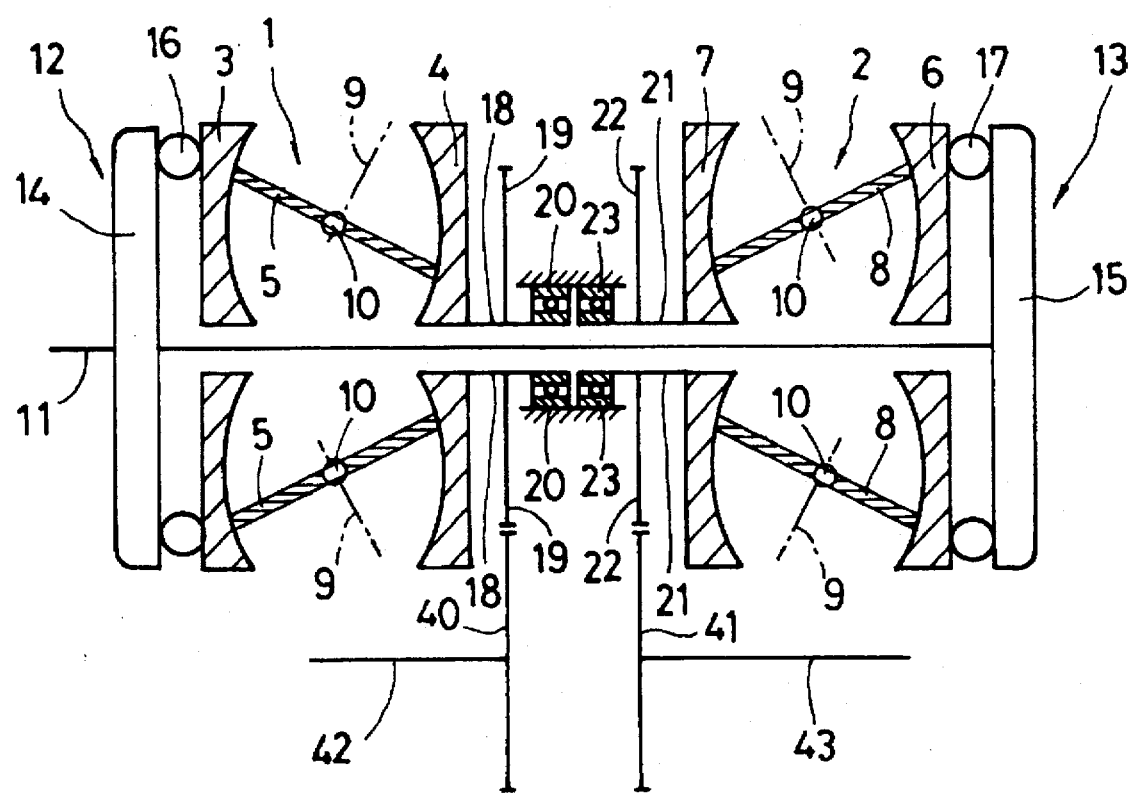
FIG. 3 is a schematic cross section showing the construction of a conventional toroidal continuous variable transmission for four-wheel drive automobiles.

Next, a second embodiment of the toroidal continuous variable transmission for four-wheel drive automobiles according to this invention is described by referring to the outline construction shown in FIG. 2. This toroidal continuous variable transmission for four-wheel drive automobiles differs from the first embodiment in that it adopts a planetary gear device 33 as the differential mechanism. In other respects, it has the same function and construction as the first embodiment, so the identical members are assigned the same reference numbers and repetition of their explanations is omitted.

The driven gear 24 in mesh with the output gear 19 is provided with a differential mechanism. In this embodiment, the differential mechanism is a double pinion type planetary gear device 33 which comprises a sun gear 34, pinions 35 in mesh with the sun gear 34, pinions 36 in mesh with the pinions 35, a carrier 37 rotatably supporting the pinions 35, 36, and a ring gear 38 in mesh with the pinions 36. The driven gear 24 is connected with the ring gear 38; the carrier 37 is connected with the output shaft 31; and the sun gear 34 is connected with the output shaft 32. The output shaft 32 is connected not only to the sun gear 34 of the planetary gear device 33 but also to the driven gear 25 and thus can receive torque from both the toroidal speed change units 1, 2.

Next, the operation of this toroidal continuous variable transmission is explained. The torque output from the toroidal speed change unit 1 is transferred to the ring gear 38 formed integral with the driven gear 24 and is then distributed through the pinions 35 and pinions 36 to the carrier 37 and the sun gear 34. The ratio between torques distributed to the carrier 37 and the sun gear 34 is almost equal to the ratio of $(Zr-Zs)/Zr$ to $Zs/Zr$ where $Zr$ represents the number of teeth of the ring gear 38 and $Zs$ represents the number of teeth of the sun gear 34.

The torque transferred from the toroidal speed change unit 1 through the driven gear 24 to the sun gear 34 is combined with a torque transferred from the toroidal speed change unit 2 to the driven gear 25. The combined torque is transferred to the output shaft 32 and further to the rear wheels. The torque conveyed from the driven gear 24 to the carrier 37 is transferred as it is to the output shaft 31 and further to the front wheels. At this time, because the ratio between torques distributed to the driven gear 24 and the driven gear 25 is nearly 50%:50%, the torque distribution ratio between the output shaft 31 connected to the front wheels and the second output shaft 32 connected to the rear wheels is given by $(Zr-Zs)/2Zr:(ZR+ZS)/2ZR$. When the gear ratio between the sun gear 34 and the ring gear 38 is 1:2, the same effect as when the differential mechanism 26 is used is produced, that is, a ratio between the torque distributions to the output shaft 31 and the output shaft 32 is approximately 1:3, or 25% for one output shaft and 75% for the other. In other words, because the front wheels are connected to the output shaft 31 and the rear wheels to the second output shaft 32, a ratio between the torque distributions to the front and rear wheels is about 1:3, i.e., 25% for the front wheels and 75% for the rear wheels.

What is claimed is:

1. A toroidal continuous variable transmission for four-wheel drive automobiles comprising:

an input shaft;

a pair of input disks that rotate with the input shaft;

a pair of loading cams that transfer a torque of the input shaft to the input disks;

a pair of output disks disposed opposite the input disks and rotatably supported on the input shaft;

tilt-rotatable power rollers disposed between the opposing input and output disks to transfer the torque from the input disks to the output disks;

a pair of output gears connected to the output disks;

a first driven gear and a second driven gear in mesh with the output gears, respectively;

a differential mechanism connected to the first driven gear;

a first output shaft connected to the differential mechanism; and a second output shaft connected to the differential mechanism and the second driven gear.

2. A toroidal continuous variable transmission for four-wheel drive automobiles according to claim 1, wherein the first output shaft drives the front wheels and the second output shaft drives the rear wheels.

3. A toroidal continuous variable transmission for four-wheel drive automobiles according to claim 1, wherein the differential mechanism is a bevel gear device which comprises first side gears connected to the first output shaft, second side gears disposed opposite the first side gears and connected to the second output shaft, pinions in mesh with the first and second side gears, and a differential case rotatably supporting the pinions and connected to the first driven gear.

4. A toroidal continuous variable transmission for four-wheel drive automobiles according to claim 1, wherein the differential mechanism is a planetary gear device which comprises a sun gear connected to the second output shaft; carriers rotatably supporting pinions in mesh with the sun gear and connected to the first output shaft; and a ring gear in mesh with the pinions and connected to the first driven gear.

5. A toroidal continuous variable transmission for four-wheel drive automobiles according to claim 4, wherein the pinions comprise first pinions in mesh with the sun gear and second pinions in mesh with the first pinions and with the ring gear.

6. A tordial continuous variable transmission for four-wheel drive automobiles according to claim 2, wherein the differential mechanism is a bevel gear device which comprises first side gears connected to the first output shaft, second side gears disposed opposite the first side gears and connected to the second output shaft, pinions in mesh with the first and second side gears, and a differential case rotatably supporting the pinions and connected to the first driven gear.

7. A tordial continuous variable transmission for four-wheel drive automobiles according to claim 2, wherein the differential mechanism is a planetary gear device which comprises a sun gear connected to the second output shaft; carriers rotatably supporting pinions in mesh with the sun gear and connected to the first output shaft; and a ring gear in mesh with the pinions and connected to the first driven gear.

8. A tordial continuous variable transmission for four-wheel drive automobiles according to claim 7, wherein the pinions comprise first pinions in mesh with the sun gear and second pinions in mesh with the first pinions and with the ring gear.

* * * * *